INVENTORS
FRANK MODRAK
ALBERT BERARDINELLI

ATTORNEY

May 28, 1963  F. MODRAK ET AL  3,090,983
CARRIER AND MANIPULATOR FOR PNEUMATIC TOOLS
Filed Feb. 6, 1961  4 Sheets-Sheet 3

INVENTORS
FRANK MODRAK
ALBERT BERARDINELLI
BY
ATTORNEY

May 28, 1963   F. MODRAK ET AL   3,090,983
CARRIER AND MANIPULATOR FOR PNEUMATIC TOOLS
Filed Feb. 6, 1961   4 Sheets-Sheet 4

INVENTORS
FRANK MODRAK
BY ALBERT BERARDINELLI

Zoltan Holoschek
ATTORNEY

United States Patent Office 3,090,983
Patented May 28, 1963

3,090,983
CARRIER AND MANIPULATOR FOR
PNEUMATIC TOOLS
Frank Modrak, 1201 Henry St., Belle Vernon, Pa., and
Albert Berardinelli, 166 Lincoln St., Cokeburg, Pa.
Filed Feb. 6, 1961, Ser. No. 87,393
2 Claims. (Cl. 15—104.1)

This invention relates to a carrier and manipulator for a pneumatic tool such as a drill, chisel, hammer or the like.

Heretofore a particularly difficult task encountered in cleaning accumulated steel and slag from walls and floors of open hearth steel furnaces, has been the necessity to manipulate manually heavy pneumatic drills, chisels and hammers in the steel furnace pits. Often the work is done while the walls of the furnace are still hot from the steel making process, which is difficult and hazardous. Sometimes the manually operated tools cannot pry loose the solidified deposits on the walls and blasting with explosives must be employed. This is dangerous to personnel and equipment and requires great skill. When the deposits are disposed at angles to vertical and horizontal directions, the workers must hold and operate the heavy tools in awkward, laborious positions.

The present invention is directed at overcoming the above mentioned and other difficulties and disadvantages of prior methods and means for cleaning steels furnaces and the like. The invention is applicable to other uses where drilling, chiseling and hammering tasks are so laborious that manual operation is precluded and automatically operated pneumatic power tools must be employed.

According to the invention there is provided a carrier for a pneumatic drill, chisel, hammer or the like which includes motor driven means for moving the tool transversely across a work face. A traveling crane, tractor, lift truck or other lifting device can be employed to support the carrier and present the working bit of the pneumatic tool to the work face. The carrier embodying the invention will then move the tool automatically but under the control of an operator back and forth across the work face. The tool may be presented to the work face in any required direction, horizontally, vertically and at angles to the horizontal and vertical. The invention makes it possible to employ larger tools than can be handled manually for performing the most difficult furnace cleaning operations. The invention is adapted to use in open pit mining operations, road building and in related applications.

It is therefore one object to provide a machine carrier for manipulating a pneumatic tool.

It is another object to provide a machine carrier which moves a pneumatic tool in a prescribed horizontal direction.

It is another object to provide a machine carrier with novel bearing means for supporting a pneumatic tool and guiding the tool while it is moved by motor drive means in a prescribed line of work.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
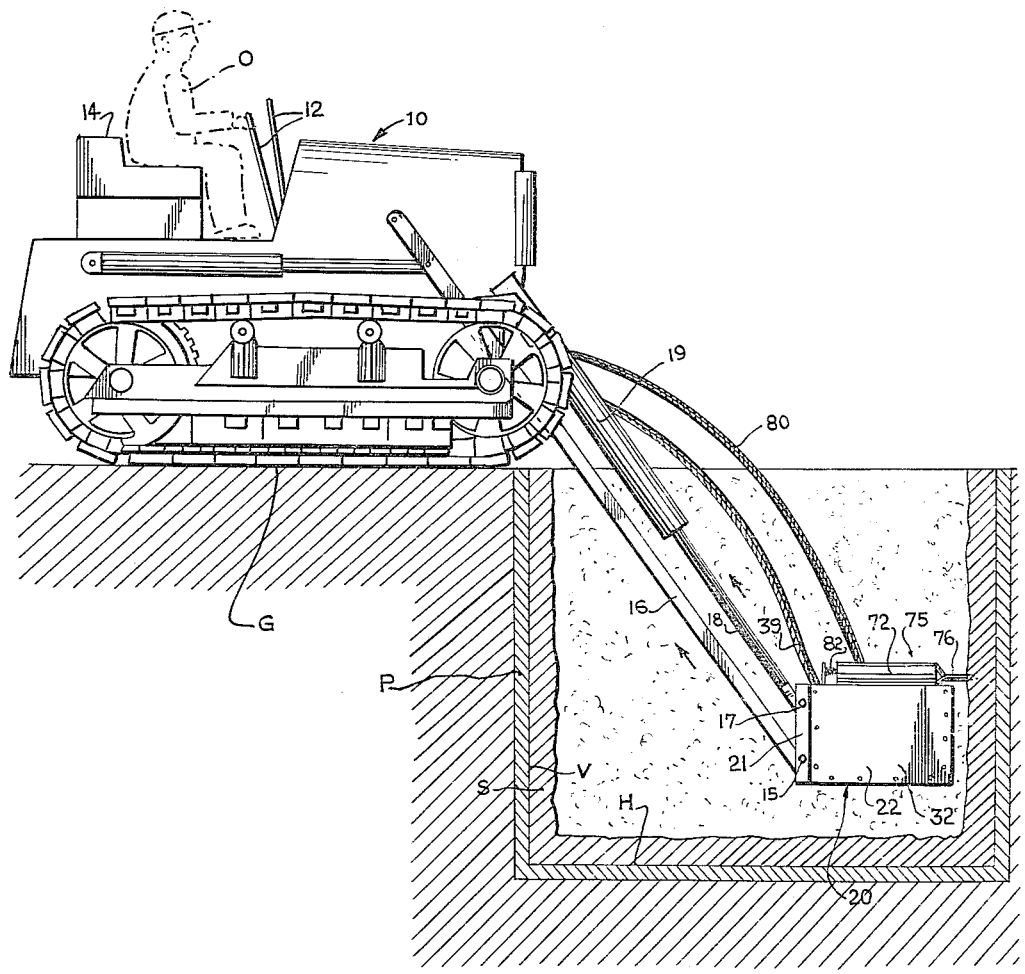
FIG. 1 is a side elevational view of a crawler tractor supporting a pneumatic tool carrier embodying the invention, in a position to work against a face of a steel furnace pit, with the bit of the tool held horizontally.

In FIG. 1 is shown a crawler tractor 10 movable on ground G. The tractor is of conventional type with controls 12 for an operator O who sits upon a seat 14. The tractor has a lifter mechanism including two spaced parallel, lower lifting arms 16 movable in vertical planes and two spaced parallel upper hydraulic operated plungers 18 movable in cylinders 19 for tilting and rotating the pneumatic tool carrier 20 in vertical planes. Arms 16 are pivotally attached by crossbar 15 to lower ends of two spaced, parallel vertical bars 21 and plungers 18 are pivotally attached by crossbar 17 to upper ends of the bars 21; see also FIGS. 2, 4, 5 and 10.

Further details of the crawler tractor need not be described here since they form no part of the present invention and are entirely conventional. The crawler tractor is illustrated only as exemplary of one device for supporting and moving the carrier 20 which embodies the invention. Similar supporting and moving functions could be performed by known types of traveling cranes, lift trucks and the like. The carrier 20 is shown supported in a furnace pit P having sides V and bottom H lined with deposits of steel and slag S.

Figure 2:
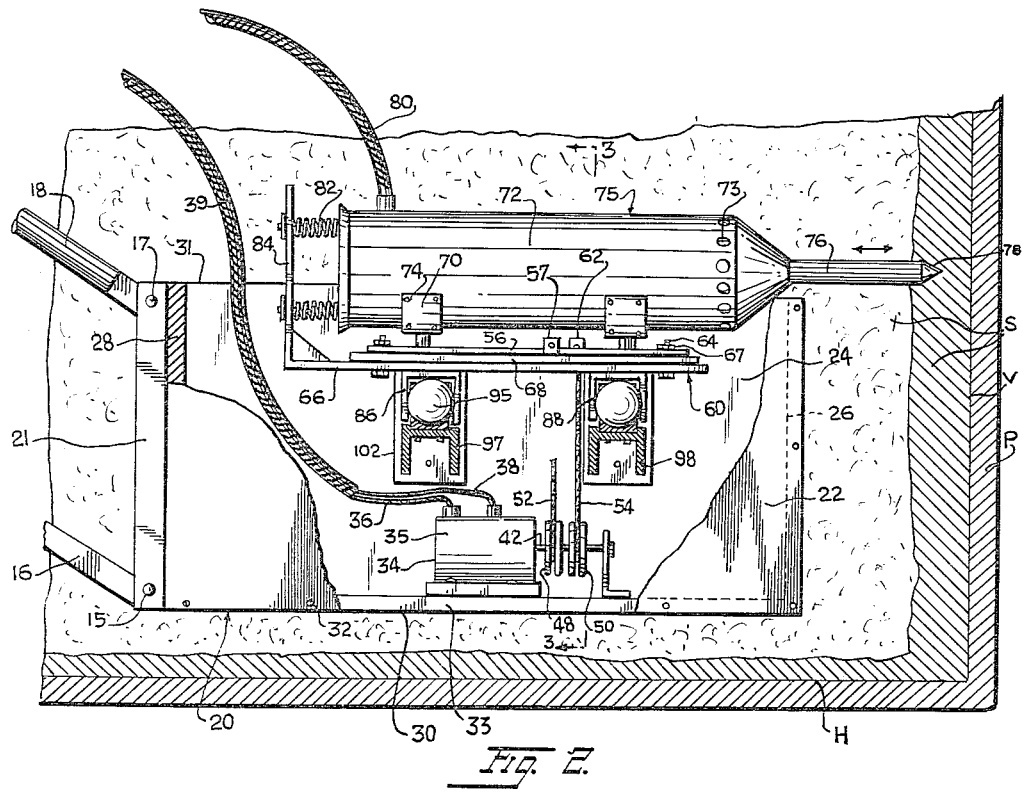
FIG. 2 is an enlarged side elevational view of the carrier in the pit, with a portion of a side wall broken away to show internal parts.
Figure 3:
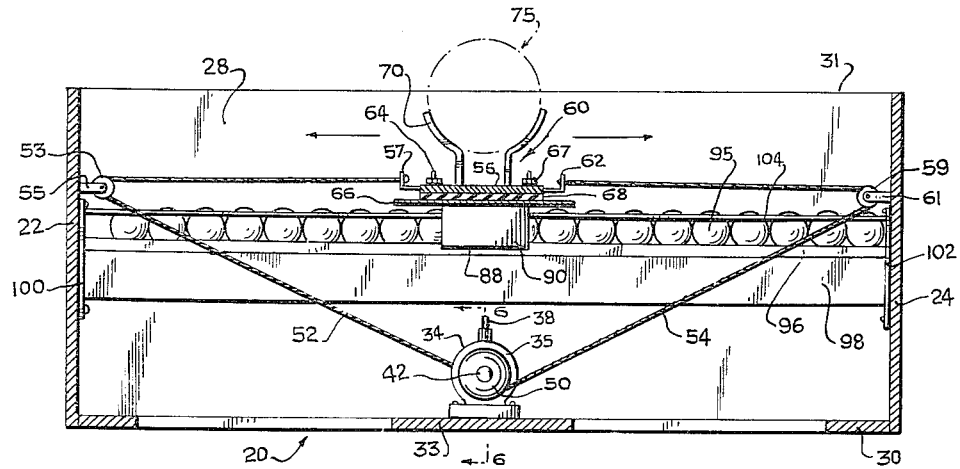
FIG. 3 is a vertical sectional view taken on line 3—3 of FIG. 2.
Figure 4:
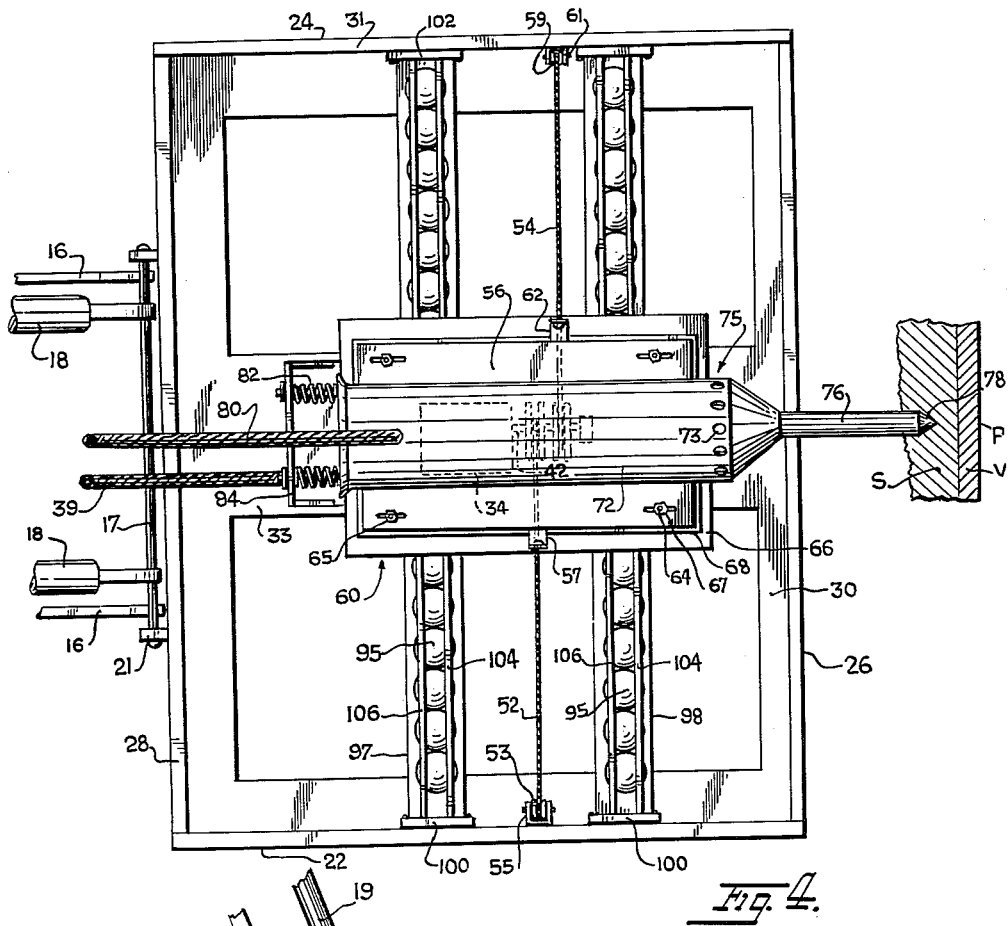
FIG. 4 is a top plan view of the pneumatic tool carrier.

The carrier 20 is shown to best advantage in FIGS. 2, 3 and 4 to which reference is now made. The carrier has a frame structure including vertical side walls 22, 24, forward end wall 26, rear end wall 28, and open frame bottom 30, and an open top 31. The end walls and bottom frame are preferably welded together, and the side walls are removably secured to the end walls and bottom frame by bolts 32. Bars 21 are welded vertically to the rear end wall 28.

Figure 6:
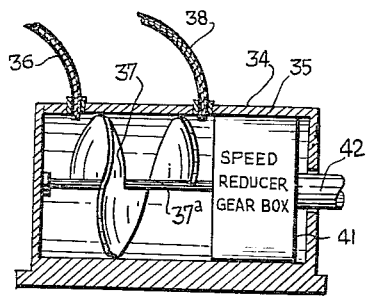
FIG. 6 is a sectional view on an enlarged scale through a pneumatic motor which drives a tool carriage employed in the apparatus, taken on line 6—6 of FIG. 3.
Figure 7:
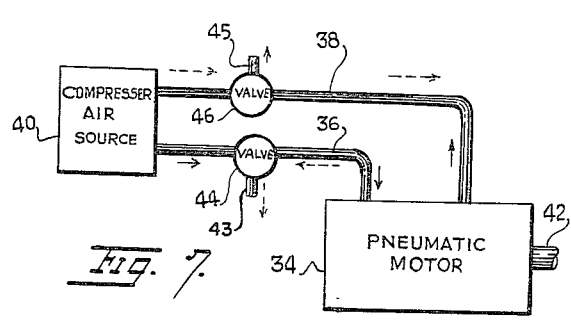
FIG. 7 is a diagram showing the air drive circuits of the pneumatic motor of FIG. 6.

Mounted on the center cross plate section 33 of the bottom frame is a pneumatic motor 34. Attached to the casing of the motor are two air hoses 36, 38 enclosed in a common casing 39 and extending upwardly out of the open top of the carrier to terminate at a source of compressed air 40 indicated schematically in FIG. 7. Motor 34, as best shown in FIG. 6, contains a helical rotor 37 which can be driven to rotate in one direction or oppositely thereto depending on whether air is fed under pressure via hose 36 or 38. The rotor rotates on and with a shaft 37ᵃ connected to a speed reducing gear box 41 having a shaft 42 extending out of the motor and serving as a power takeoff member. Referring to FIG. 7, it will be noted that two-way valves 44, 46 are connected between the hoses 36, 38 and the air supply 40. Nozzles 43, 45 of the valves vent to the atmosphere. If valve 44 is set to close nozzle 43 and open the air path from source 40 to motor 34, valve 46 should be set to open nozzle 45 to the atmosphere and shut off the air supply to hose 38. Air will then flow as shown in the solid arrows and drive the rotor in one direction. By reversing the valve positions, air flows as shown by the dotted line arrows through hose 38 to the motor and from hose 36 to the venting nozzle 43. These valves when properly operated permit the direction of the motor drive to be controlled. If both valves are opened to admit air through hoses 36 and 38 into the motor, the rotor is locked under air pressure and will not rotate.

Shaft 42 carries pulleys 48, 50, best shown in FIGS. 2 and 3. Steel cables 52, 54 are entrained on the respective pulleys. Cable 52 extends outwardly and upwardly around idler pulley 53 attached by bracket 55 to side wall 22 of the carriage. The cable 52 terminates on a bracket 57 secured to a side edge of a plate 56 in carriage 60. Cable 54 extends outwardly and upwardly around idler pulley 59 attached by bracket 61 to side wall 24 and terminates on a bracket 62 secured to the opposite side edge of plate 56. As viewed in FIG. 3, cable 54 winds up on pulley 50 when this pulley rotates clockwise while cable 52 unwinds from pulley 48. Cable 52 winds up on pulley 48 when the pulleys rotate counterclockwise while cable 54 at the same time unwinds from pulley 50. Depending on the direction of drive of the motor 34, therefore, the carriage 60 will be drawn horizontally toward wall 22 or wall 24 of the carrier 20.

Carriage 60 includes a base plate 66 on which is a rubber pad 68. Plate 56 mounts on the pad and is held there by nuts 67 and bolts 64 inserted through elongated registering slots 65 in the plates 56, 66 and pad 68; see FIG. 4.

Bracket arms 70 are welded to plate 56 and stand upwardly therefrom. The brackets have arcuate ends in which seats the cylindrical body 72 of a pneumatic chisel, drill or hammer 75. The body 72 is secured to the bracket arms by bolts 74; see FIG. 2. A cylindrical shaft 76 extends axially out of the body of the tool and terminates in a tool bit 78 which can be applied to the vertical wall V or horizontal floor H of a furnace P. The pneumatic tool itself is of conventional design. It is supplied with compressed air via a hose 80 which extends from the body of the tool upwardly out of the open top of the carrier 20 and terminates at a suitable source of compressed air (not shown). The tool body has vents 73 for discharging spent air from the tool. When the tool is operating the working shaft 76 reciprocates axially so that bit 78 strikes the working face to which it is applied. At the rear end of the tool body are recoil takeup springs 82 seated on and secured to a vertical plate 84 secured to the base plate 66.

Figures 8, 9:
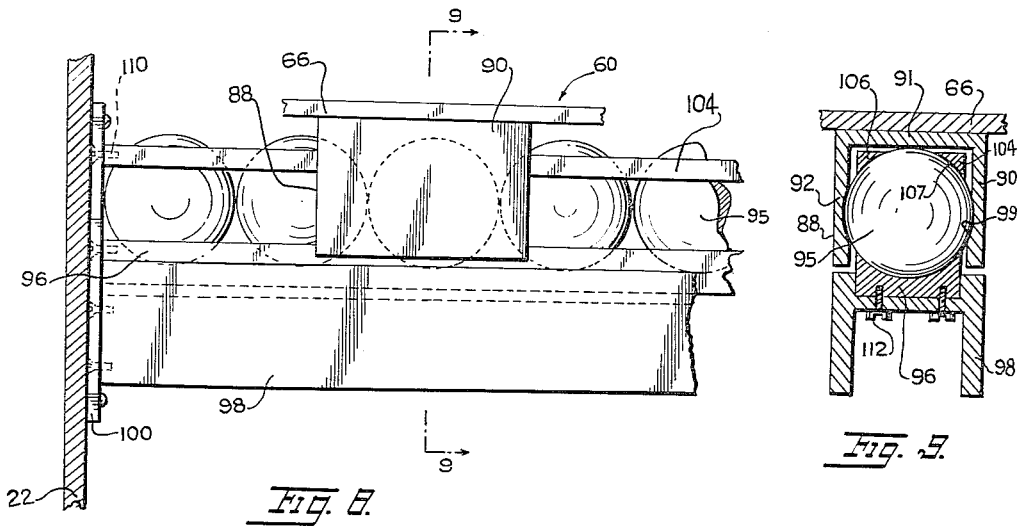
FIG. 8 is an elevational view on an enlarged scale of a portion of FIG. 3, showing parts of a bearing race and tool carriage.
FIG. 9 is a sectional view taken on line 9—9 of FIG. 8.

Secured to the underside of the base plate are two channel-shaped bearing members 86, 88. These members extend longitudinally transversely to the axis of the cylindrical pneumatic tool. Members 86, 88 each have a front wall 90, top wall 91 and rear wall 92. The inner sides of these walls all contact ball bearings 95 supported in two spaced, parallel horizontal bearing races 96 set in grooves at the tops of channel-shaped race supports 97, 98; see FIGS. 2, 3, 4, 8 and 9. Races 96 are secured by screws 112 to supports 97, 98. Opposite ends of supports 97, 98 are attached to plates 100, 102 mounted on the side walls 22, 24 of the carrier. Bearing race bars 104, 106 are disposed in horizontally spaced positions on bearings 95 above each bearing race 96 and are secured by screws 110 (see FIG. 8) to the end plates 100, 102. As clearly shown in the drawing (FIG. 9) the ball bearings are exposed and project beyond the bearing races and race bars on three sides for contacting the inner sides of the bearing members 86, 88. The inner sides of walls 90 and 92 are thickened at their bottom edges and provide concave seats 99 for engaging the ball bearings. Bars 104, 106 are generally triangular in cross section with concave inner sides 107 contacting the ball bearings.

Figure 5:
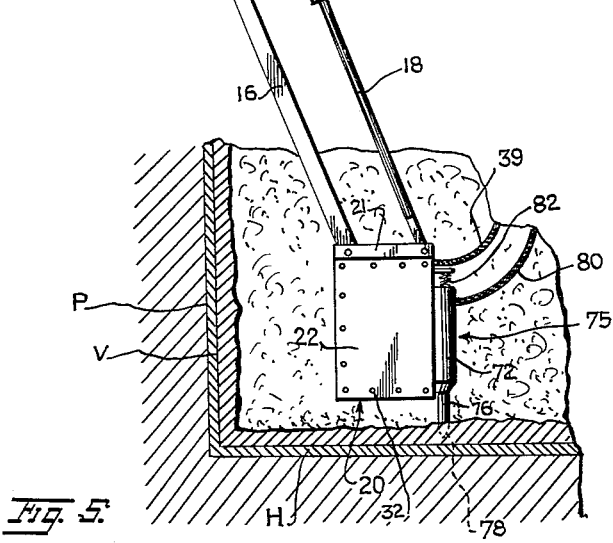
FIG. 5 is another side elevational view of the pneumatic tool carrier similar to a portion of FIG. 1 but showing the carrier disposed to hold the bit of the tool vertically.
Figure 10:
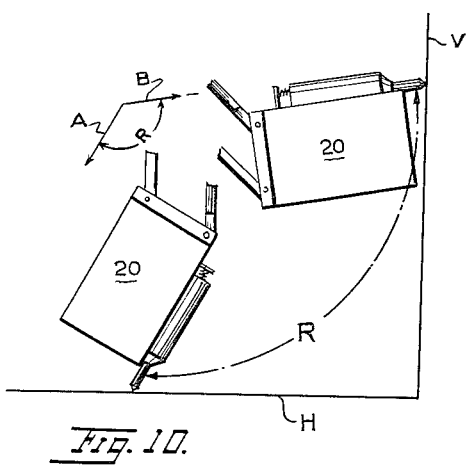
FIG. 10 is a diagram showing a range of positions in which the pneumatic tool carriage is operative in accordance with the invention.

In operation of the apparatus, the carrier 20 can be disposed as shown in FIG. 1 with the axis of tool 75 horizontal, as shown in FIG. 5 with the axis of tool 75 vertical, or in any angular position A—B with respect to vertical and horizontal planes V and H in the angular range R as indicated in FIG. 10. In any of these positions, the carriage 60 will be supported by contact of the bearing members 86, 88 on ball bearings 95 in the two horizontal bearing race assemblies extending transversely across the carrier. As the operator selectively controls the direction of operation of motor 34 by means of valves 44, 45, the carriage 60 will be drawn horizontally between vertical walls 22 and 24 of the carrier. This will carry the tool 75 in a horizontal direction perpendicular to its axis which will always be disposed in a vertical plane regardless of its angle of tilt to the horizontal. The tractor 10 or other elevating device will apply the bit 78 of the tool to the surface S to be worked, but the horizontal traverse of the tool will be automatic and power operated, regardless of whether the tool is applied to vertical, horizontal or angular surfaces of the furnace P or other work location. The inner sides of bearing members 86, 88 will slide along the ball bearings as the carriage 60 is drawn along inside the carrier 20. The length of the horizontal path traveled by the carriage is, of course, limited by the width of the carrier. After a prescribed length of horizontal line has been worked on the furnace walls, the tractor will elevate, lower, tilt and adjustably position the carrier 20 for working on another portion of the furnace walls.

The laborious manual lifting and holding of the pneumatic tool hitherto required is eliminated by use of the tractor or other lifting device, and the difficult manipulation of the tool along the work surface heretofore done manually is accomplished by the automatic motor controlled horizontal movement of the carriage 60 on which the tool 75 is mounted.

It is possible to replace the pneumatic drive motor by a reversible electric motor. The tractor, as mentioned previously, can be replaced by a traveling crane or the like. The pneumatic tool 75 can be replaced by other types of tools such as power saws, routers, etc. The invention has wide application beyond furnace cleaning and may be used in mining, road building, etc.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A device for cleaning walls and floors of a furnace pit located below ground level, comprising a crawler tractor movable on ground level, a pair of spaced parallel lifting arms pivotally carried by the tractor and tiltable in parallel vertical planes below the tractor to extend into the pit, a pair of spaced parallel plungers carried by the tractor, said plungers being axially extensible into the pit below ground level and retractable therefrom, a rectangular frame structure having spaced side walls, a front end wall and a rear end wall, said arms and plungers having lower ends pivotally attached at four spaced corner points to the rear end wall for raising and lowering the frame structure vertically and for tilting the frame structure around a horizontal axis in the pit, bearing race assemblies extending horizontally between said side walls, a carriage having depending bearing members riding on said bearing race assemblies, motor means for driving said carriage horizontally in opposite directions along said bearing assemblies, bracket members extending upwardly from said carriage, and a generally cylindrical tool supported on said bracket members, said tool having a working bit extending axially beyond the front wall of said frame structure for working against horizontal, vertical, and angular surfaces in said pit below ground level.

2. A device according to claim 1, further comprising a base plate on said bearing members, a resilient pad on said base plate, and a mounting plate on the pad, said bracket members being secured to said mounting plate for resiliently supporting the tool on the carriage.

References Cited in the file of this patent
UNITED STATES PATENTS

| | | |
|---|---|---|
| 962,502 | Elmborg | June 28, 1910 |
| 2,228,445 | Velbiss | Jan. 14, 1941 |
| 2,260,169 | Couch | Oct. 21, 1941 |
| 2,299,718 | De Florez | Oct. 20, 1942 |
| 2,834,576 | Ivey | May 13, 1958 |
| 2,967,316 | Kandle | Jan. 10, 1961 |
| 2,983,496 | Grant | May 9, 1961 |
| 2,985,250 | Goodrich et al. | May 23, 1961 |